(12) United States Patent
Disney

(10) Patent No.: US 11,553,327 B1
(45) Date of Patent: Jan. 10, 2023

(54) SYSTEM AND METHOD FOR STORING PERSONAL INFORMATION

(71) Applicant: Steve Disney, Lewis Run, PA (US)

(72) Inventor: Steve Disney, Lewis Run, PA (US)

( * ) Notice: Subject to any disclaimer, the term of this patent is extended or adjusted under 35 U.S.C. 154(b) by 0 days.

(21) Appl. No.: 17/718,397

(22) Filed: Apr. 12, 2022

Related U.S. Application Data

(60) Provisional application No. 63/300,854, filed on Jan. 19, 2022.

(51) Int. Cl.
| | | |
|---|---|---|
| *H04W 8/18* | (2009.01) | |
| *H04L 67/025* | (2022.01) | |
| *H04L 67/306* | (2022.01) | |
| *H04N 21/274* | (2011.01) | |

(52) U.S. Cl.
CPC ............ *H04W 8/18* (2013.01); *H04L 67/025* (2013.01); *H04L 67/306* (2013.01); *H04N 21/274* (2013.01)

(58) Field of Classification Search
None
See application file for complete search history.

(56) References Cited

U.S. PATENT DOCUMENTS

| | | | |
|---|---|---|---|
| 7,958,457 B1 * | 6/2011 | Brandenberg ........ | G06F 1/1632 715/811 |
| 2009/0254572 A1 * | 10/2009 | Redlich ................. | G06Q 10/06 |
| 2016/0210578 A1 * | 7/2016 | Raleigh ................. | H04W 28/12 |
| 2018/0350144 A1 * | 12/2018 | Rathod ................. | H04W 4/021 |

FOREIGN PATENT DOCUMENTS

| | | | | |
|---|---|---|---|---|
| CA | 2819202 A1 * | 6/2012 | ............. | H04H 60/31 |

OTHER PUBLICATIONS

Hafeez et al., "Securing Edge Networks with Securebox",Dec. 20, 2017, ArXiv, (Year: 2017).*

\* cited by examiner

*Primary Examiner* — Davoud A Zand
(74) *Attorney, Agent, or Firm* — Brennan Manna & Diamond, LLC

(57) ABSTRACT

The present invention relates to a system and method for a mobile application and web based personal history storage and retrieval. The system stores all personal information of a user in a plurality of selectable categories and in a selectable chronological manner. The system has a server coupled to a storage system for generating user interfaces for the application and web and for storing user information. The system enables users to enter information and important dates and events during their life to be sorted and filtered in chronological order. The application enables the information to be stored for future use, similar to a time capsule. The system enables the information to be retrieved allowing friends and family to view a full documentation of their loved one's life with ease.

20 Claims, 16 Drawing Sheets

SYSTEM AND METHOD FOR STORING PERSONAL INFORMATION

CROSS-REFERENCE TO RELATED APPLICATION

The present application claims priority to, and the benefit of, U.S. Provisional Application No. 63/300,854, which was filed on Jan. 19, 2022 and is incorporated herein by reference in its entirety.

FIELD OF THE INVENTION

The present invention relates generally to media storage systems. More specifically, the present invention relates to a system, a method, and a computer implemented application that facilitates storage of all relevant information of a user at a single location wherein the information is uploaded by the user. The information is digital and is easy to upload and retrieve. The system has a client-server architecture that uses a computer implemented application installed in a user device or a website for communicating with a server. The information is stored in chronological manner and can be viewed by family and friends. Accordingly, the present disclosure makes specific reference thereto. Nonetheless, it is to be appreciated that aspects of the present invention are also equally applicable to other like applications, devices, and methods of manufacture.

BACKGROUND

With the advent of the internet and more importantly social media, individuals have started uploading and storing their important moments of life on social media. Individuals like to upload and store their photos, videos, important documents and more on social media platforms. However, a problem with the social media is that personal information is distributed and stored on a plurality of social media platforms, thereby leading to security issues and also prohibiting all the important life stories and moments from residing at a singular location. A user needs to access multiple social media platforms to view all the life stories and personal history. Friends and family of the user may not be able to view all the photos, documents, and other keepsakes on all the social media platforms, thereby preventing them from enjoying personal histories of their loved ones.

Some individuals try to store all the personal life stories and media information related to life events on hard disks and other storage devices, however, such devices can be stolen or lost, causing all the stored data be lost. Also, individuals trying to locate all their personal information on social media platforms and store same at a single online location, find it time consuming and frustrating. Individuals desire a system that enables them to securely store all their personal historical information at a singular location without fear of data getting lost or destroyed.

Therefore, there exists a long-felt need in the art for a system and method that enables individuals to store their personal digital collections (i.e., videos, documents, pictures) and other media at a single location. There is also a long-felt need in the art for a system and method that ensures the stored digital data is secure. Additionally, there is a long-felt need in the art for a system that enables friends and families of a user to go through said history of the user. Further, there is a long-felt need in the art for a system that enables users to maintain security of their uploaded data. Furthermore, there is a long-felt need in the art of a multimedia storage system that stores data in numerous categories to subsequently filter through while ensuring items are uploaded in chronological order. Finally, there is a long-felt need in the art for a system and method that offers a way for friends and family to view a full documentation of their loved one's life with ease without jumping onto a plurality of social media platforms.

The subject matter disclosed and claimed herein, in one embodiment thereof, comprises a computer implemented media storage system. The system comprising a client-server architecture and having a web or application server embodied on a computer system that is configured to generate user interfaces accessible to users on a mobile application and website for interacting with the server. The generated user interfaces comprising a graphical user interface used by one or more users for logging into the system; a graphical user interface for displaying one or more categories of user uploaded content; a graphical user interface for generating a new category; a graphical user interface for uploading content to said one or more categories; a graphical user interface for setting security options for uploaded content; a graphical user interface for editing and displaying media and sharing same on third party social media platforms; a graphical user interface for displaying subscription plans for the users; and a graphical user interface for zooming in a displayed media wherein the system has a cloud storage for storing the uploaded content.

In this manner, the media storage system and associated method of the present invention accomplishes all of the foregoing objectives and provides an effective way of compiling all relevant information about a person's life at a single location in secure manner. The system enables users to upload photos, writings, and other information into their personal account for public or private display. The content is categorized into a plurality of categories and are uploaded in chronological manner. The system offers a way for friends and family to view a full documentation of their loved one's life with ease.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a method for compiling personal digital information of a user in chronological order. The method includes the steps of providing an application server coupled to cloud storage for generating interfaces for users and storing digital information of users; providing a mobile application installed on a user device and a website running on a browser for displaying user interfaces generated by said application server; wherein the graphical user interfaces provide the capability to a user for selecting a category from a plurality of categories for viewing a digital media; providing the capability to the user for uploading new digital media for storing into one of said plurality of categories; providing the ability to the user to edit, share, download, and tag one or more stored media; providing the ability to the user to set security policy with respect to one or media for permitting access to said media; providing the ability to create a new category for storing media wherein uploaded media is stored in said cloud storage and is uploaded only after a successful login of the user.

In a further embodiment of the present invention, a computer implemented media storage system is disclosed. The system comprising a web server embodied on a computer system and is configured to generate user interfaces accessible to users on a mobile application and website. The generated user interfaces comprising a graphical user interface used by one or more users for logging into the system; a graphical user interface for displaying one or more categories of user uploaded content; a graphical user interface for generating a new category; a graphical user interface for uploading content to said one or more categories; a graphical user interface for setting security options for uploading content; a graphical user interface for editing and displaying media and sharing same on third-party social media platforms; a graphical user interface for displaying subscription plans for the users; and a graphical user interface for zooming in a displayed media wherein the system has a cloud storage for storing said uploaded content.

In yet another embodiment of the present invention, the graphical user interface displays a home page that displays a plurality of categories having at least one of photos, videos, documents, and journals therein.

In yet another embodiment of the present invention, a non-transitory computer-readable medium comprising instructions is disclosed. The non-transitory, computer-readable medium comprising instructions are executed by a processor and configured to electronically receive personal digital content uploaded by a user, authenticating the user during sign in, upon successful authentication displaying a home page to the user, displaying a list of categories having digital content stored therein, the content is stored in chronological manner, and receiving a request on a filter button to set filters for displaying a subset of information.

The advantage of the system and method of the present invention is that it enables friends and family to view a full documentation of their loved one's life with ease at a single location. The application authenticates the users before allowing them to use the application and thus increases the authenticity of the users using the application. The user can make their content public or private as per their preferences and can share easily to other third-party social media platforms.

To the accomplishment of the foregoing and related ends, certain illustrative aspects of the disclosed innovation are described herein in connection with the following description and the annexed drawings. These aspects are indicative, however, of but a few, of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
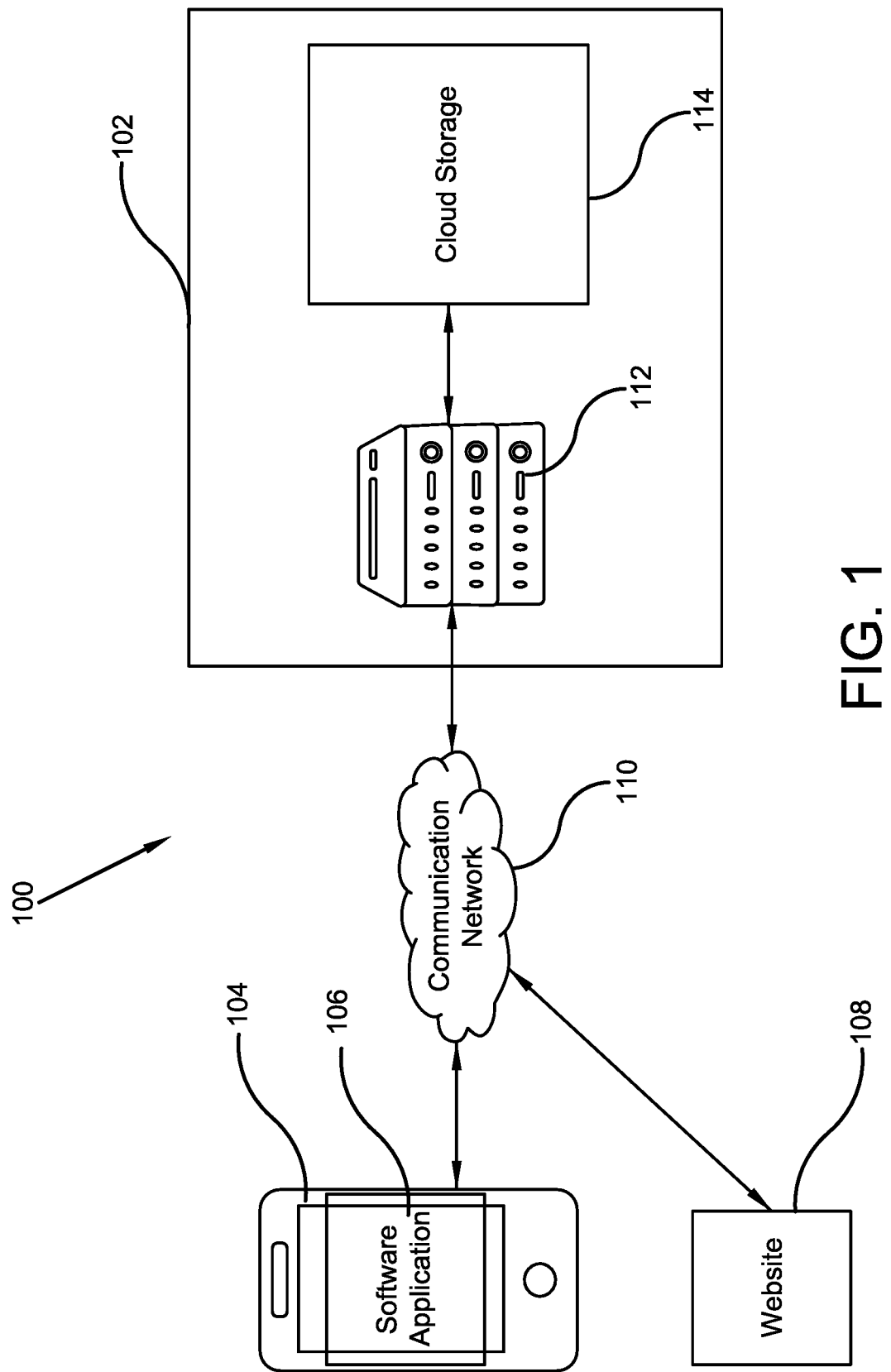
FIG. 1 is a schematic diagram illustrating one potential embodiment of a media storage and retrieval system of the present invention for securely storing all types of personal media for retrieval in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a system and method that enables individuals to store their personal digital collections (i.e., videos, documents, pictures) and other media at a single location. There is also a long-felt need in the art for a system and method that ensures the stored digital data is secure. Additionally, there is a long-felt need in the art for a system that enables friends and families of a user to go through said history of the user. Further, there is a long-felt need in the art for a system that enables users to maintain security of their uploaded data. Furthermore, there is a long-felt need in the art of a multimedia storage system that stores data in numerous categories to subsequently filter through while ensuring items are uploaded in chronological order. Finally, there is a long-felt need in the art for a system and method that offers a way for friends and family to view a full documentation of their loved one's life with ease without jumping onto a plurality of social media platforms.

The present invention, in one exemplary embodiment, is a novel method for compiling personal digital information of a user in a chronological order. The method includes the steps of providing an application server coupled to cloud storage for generating user interfaces for users and storing digital information of users; providing a mobile application installed on a user's device and a website running on a browser for displaying user interfaces generated by said application server; wherein the graphical user interfaces provide the capability to a user for selecting a category from a plurality of categories for viewing a digital media; providing the capability to the user for uploading new digital media for storing into one of said plurality of categories; providing the ability to the user to edit, share, download and tag one or more stored media; providing the ability to the user to set security policy with respect to one or media platforms for permitting access to the media on said platforms; and providing the ability to create a new category for storing media wherein uploaded media is stored in said cloud storage and is uploaded only after a successful login of the user.

Referring initially to the drawings, FIG. 1 is a schematic diagram illustrating one potential embodiment of a media storage and retrieval system 100 of the present invention for securely storing all types of personal media for retrieval in accordance with the disclosed architecture. The system 100 of the present invention is configured to store and compile all relevant information of a user for views by the user, friends, and family. More specifically, the system 100 has a client-server architecture wherein a user accesses the system 100 and its offerings through a multifunctional software application 106 installed on a handheld user device 104 or through a website 108 accessible on a browser.

The system 100 has a server system 102, that is coupled to one or more user devices 104 via a communication network 110 such as internet. The application 106 installed on the user device 104 is capable of displaying user interfaces allowing a user to access functionalities provided by the system 100. The user device 104 enables a user to input data, receive data, and/or transmit data within the system 100 using the software application 106. It will be apparent to a person of ordinary skill in the art that the user may be any individual using the system 100. Examples of the user device 104 may include, but are not limited to, a desktop computer, a notebook computer, a laptop computer, a handheld computer, a touch sensitive device, a computing device, a smart-phone, and/or a smart watch.

The server system 102 may be a network of computers, a software framework, or a combination thereof, that may provide a generalized approach to create a server implementation. More specifically, the server system 102 includes an application/web server 112 and one or more associated cloud storage 114. The application server 112 and the cloud storage 114 can be integrated as a single unit or can be coupled to each other through a network. Examples of the application server 112 may include, but are not limited to, personal computers, laptops, minicomputers, mainframe computers, any non-transient and tangible machine that can execute a machine-readable code, cloud-based servers, distributed server networks, or a network of computer systems. The application server 112 can be realized through various web-based technologies such as, but not limited to, a Java web-framework, a NET framework, a personal home page (PUP) framework, or any web-application framework.

The application server 112 is configured to have the logic, instructions, circuitry, interfaces, and/or codes for executing various operations required for communication between the server 102 and the user device 104 and also between the cloud storage 114 and the server 102.

The cloud storage 114 may have partitions or silos for storing information associated with users of the system 100. The cloud storage 114 is also configured to have mass storage for storing media including, videos, photos, journals, documents, and more of users. The cloud storage 114 is configured to store media of all formats and also can be updated to be compatible with the newer storage formats. It should be understood that embodiments of the present disclosure are intended to include and/or otherwise cover any type of the data associated with the users registered with the system 100. Examples of the cloud storage 114 may include but are not limited to, a relational database, object-oriented database, cloud database, object storage, block storage or the like.

The software application 106 and the website 108 enables users to upload photos, videos, writings, and other information into their personal account for public or private display and provides numerous categories to filter through while ensuring items are uploaded in chronological order. It should be appreciated that there may be no limit as to what type of information can be uploaded to a user's profile.

The communication network 110 may include suitable logic, circuitry, and interfaces that may be configured to provide a plurality of network ports and a plurality of communication channels for transmission and reception of data related to operations of various entities (such as the user device 104 and the server system 102) of the system 100. The communication network 110 may be associated with an application layer for implementation of communication protocols based on one or more communication requests from the user device 104, website 108, and the server system 102. The communication data may be transmitted or received, via the communication protocols. Examples of the communication protocols may include, but are not limited to, Hypertext Transfer Protocol (HTTP), File Transfer Protocol (FTP), Simple Mail Transfer Protocol (SMTP), Domain Network System (DNS) Protocol, Common Management Interface Protocol (CMIP), Transmission Control Protocol and Internet Protocol (TCP/IP), User Datagram Protocol (UDP), Long Term Evolution (LTE) communication protocols, or any combination thereof.

In one embodiment, the communication data may be transmitted or received via at least one communication channel of a plurality of communication channels in the communication network 110. The communication channels may include, but are not limited to, a wireless channel, a wired channel, a combination of wireless and wired channels thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Metropolitan Area Network (MAN), a satellite network, the internet, a fiber optic network, a coaxial cable network, an infrared (IR) network, a radio frequency (RF) network, and a combination thereof. Embodiments of the present invention are intended to include or otherwise cover any type of communication channel, including known related art and/or later developed technologies.

Figure 2:
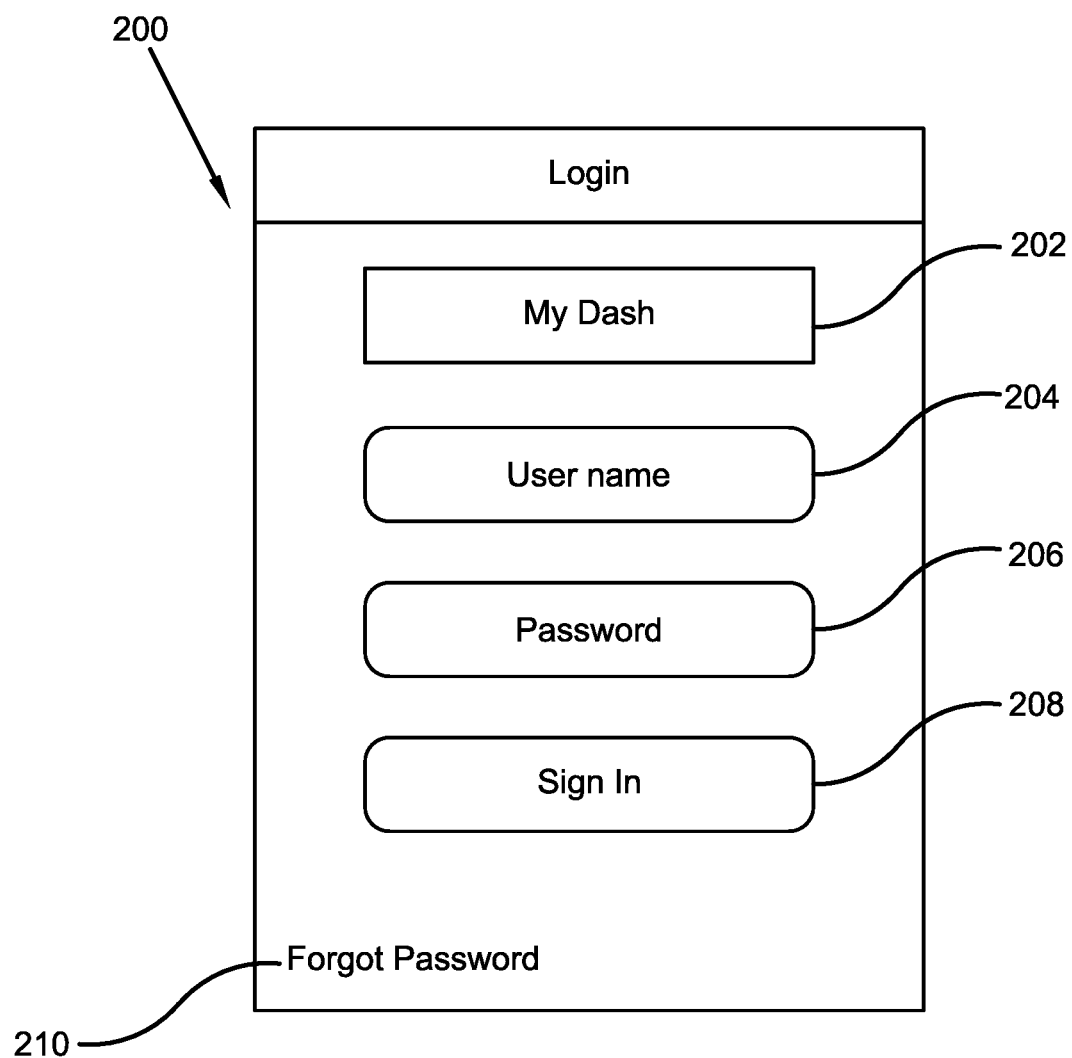
FIG. 2 illustrates an exemplary login page user interface displayed by the personal information storage application or website in accordance with the disclosed architecture.

FIG. 2 illustrates an exemplary login page user interface 200 displayed by the personal information storage application 106 or website 108 in accordance with the disclosed architecture. The login page user interface 200 is used by a user for logging in to the application 106 for accessing functionalities offered by the system 100 of the present invention. The login page 200 displays the logo/name 202 such as "My Dash" of the application for branding purposes. The login page 200 further provides a username tab 204 used for inputting a username, a password tab 206 for inputting a password for accessing the account and profile of a user. After inputting the said information, the sign-in button 208 is selected by the user for logging into the application 106.

The application 106 also provides a "Forgot Password" option 210, thereby allowing a user to get a new password, in case the current password is forgotten by the user.

An advantage of the application 106 and the system 100 is that families and friends of a user can view the media uploaded to the user's profile by logging into the application, thus, enabling the uploaded media to function as a memoir for the user.

Figure 3:
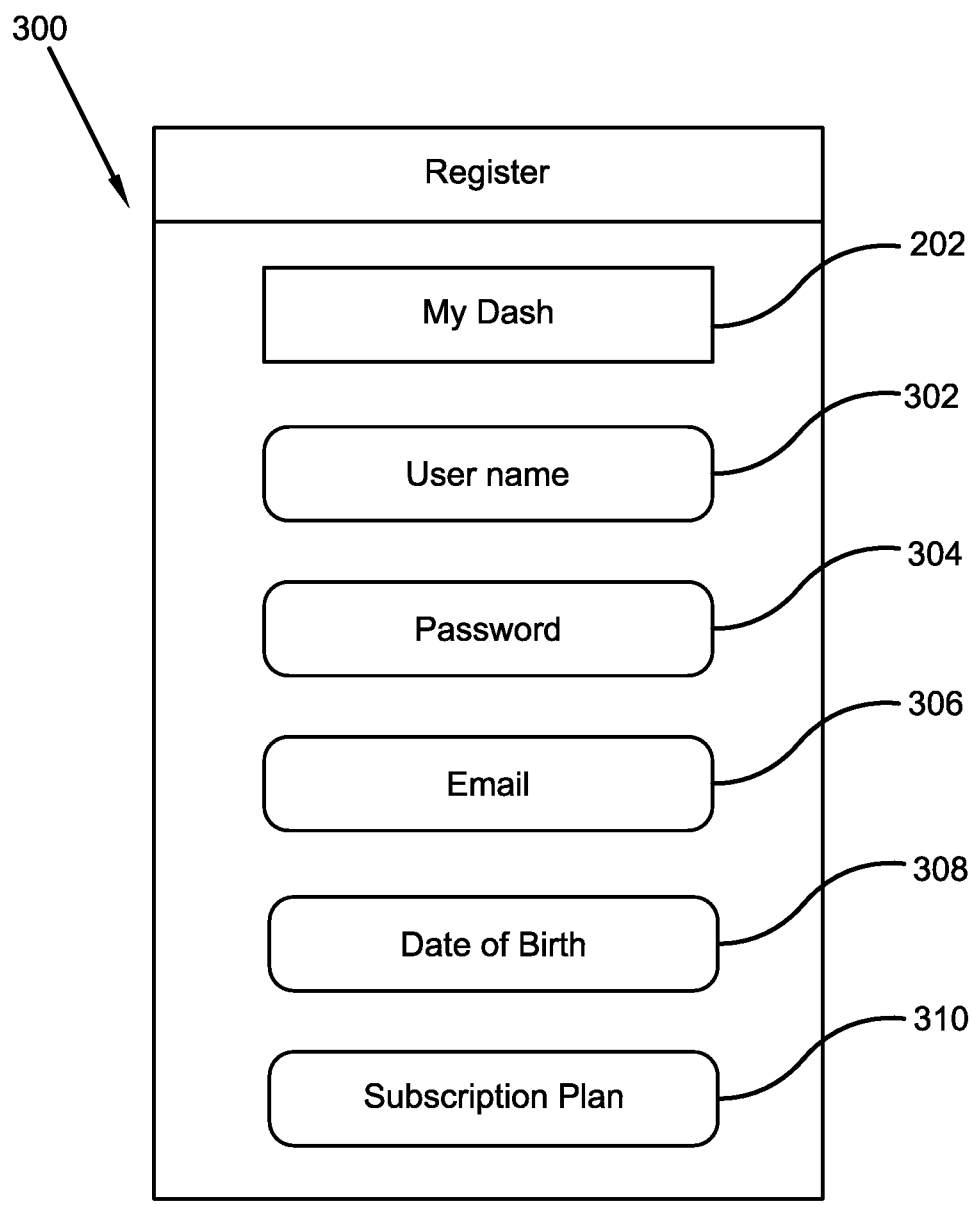
FIG. 3 illustrates an exemplary sign-up or registration page user interface displayed by the personal information storage application or website in accordance with the disclosed architecture.

FIG. 3 illustrates an exemplary sign-up page user interface 300 displayed by the personal information storage application 106 or website 108 in accordance with the disclosed architecture. The sign-up page user interface 300 is used by a user to sign up or register for the application 106 to access functionalities offered by the system 100 of the present invention. The sign-up page 300 displays the logo/name 202 such as "My Dash" of the application for branding purposes.

The sign-up page 300 further provides a username tab 302 for selecting a username, a password tab 304 for selecting a password for creating the account and profile of a user. An email ID 306 is required for a user, where an email may be sent when a password is forgotten by the user. Additional information such as date of birth 308 can also be required to be input by a user for signing up on the application 106. It should be noted that based on the preference of the developer and regulations, any additional information including, but not limited to, gender, age, location and more can be required to input during the signing process.

A subscription plan 310 may be chosen by the user for completing the sign-up process. The system 100 of the present invention offers a plurality of subscription plans to meet requirements and preferences of end consumers. The exemplary subscription plans are described in detail later in the disclosure.

Figure 4:
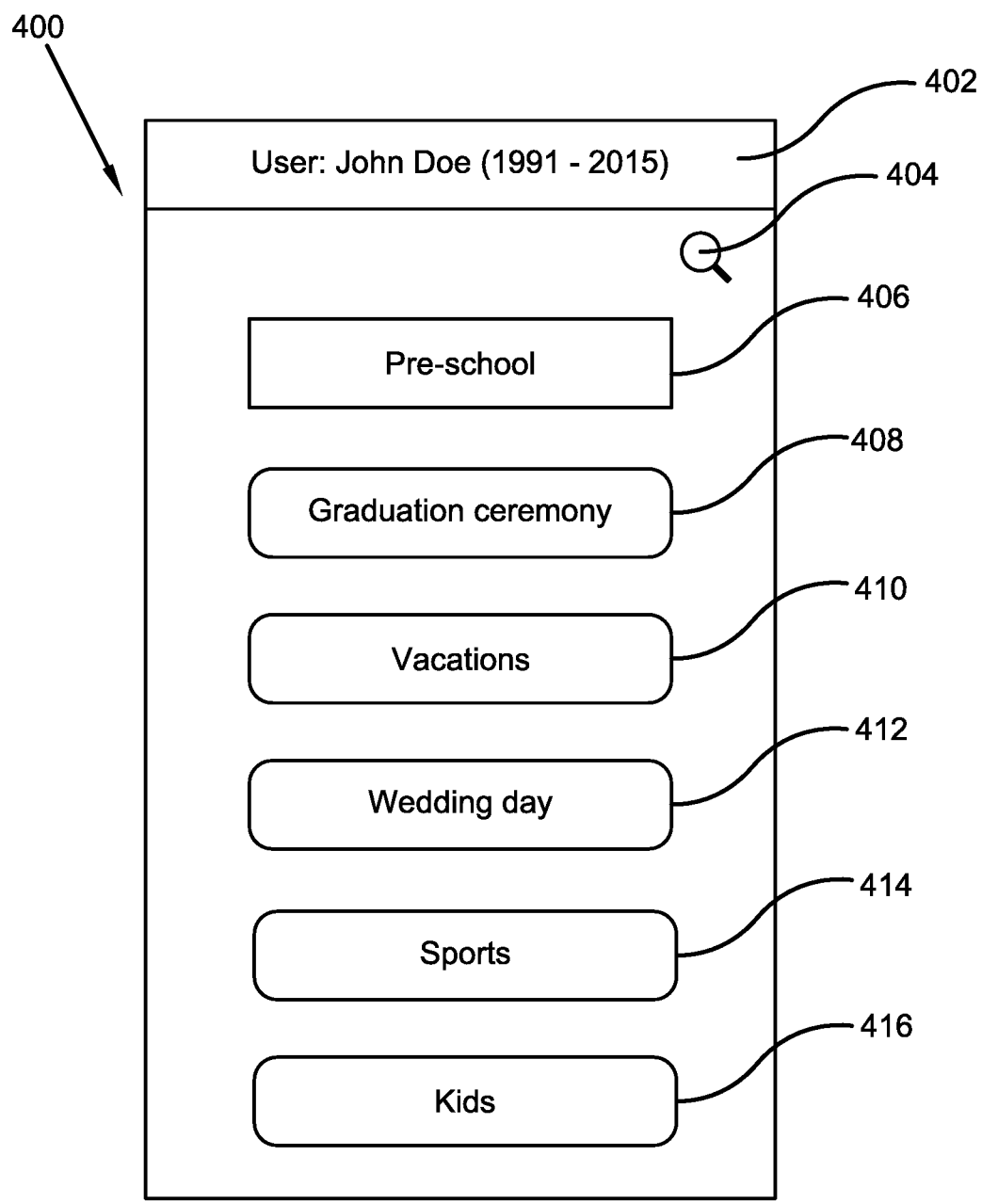
FIG. 4 illustrates an exemplary home page user interface for a user as displayed by the personal information storage application or website in accordance with the disclosed architecture.

FIG. 4 illustrates an exemplary home page user interface 400 for a user as displayed by the personal information storage application 106 or website 108 in accordance with the disclosed architecture. The home page 400 is configured to display the categories of information defined by the logged in user 402, thereby allowing any visiting user to easily view and scroll the information. The home page 400 provides a search bar 404 for searching the content using any metadata (such as tags or any other description). Information about tags and description is provided in further detail later in the disclosure.

As illustrated, some of the categories displayed on the home page/profile page 400 of the user 402 are pre-school 406, graduation ceremony 408, vacations 410, wedding day 412, sporting events 414, and kids 416. It should be understood that the illustrated categories are exemplary and the application 106 may provide any category as per preferences of the user. Further, the user can create new personalized categories. Each displayed category may have an associated thumbnail displayed on the profile page 400.

An advantage of the home page 400 provided by the application/website is that the duration or tenure of the stored data is also displayed, thereby allowing a visiting user to have an indication of the time frame from which the media is present in the application 106. As shown, the logged in user is "Jon Doe" and the media/content has duration from "1991-2015".

Figure 5:
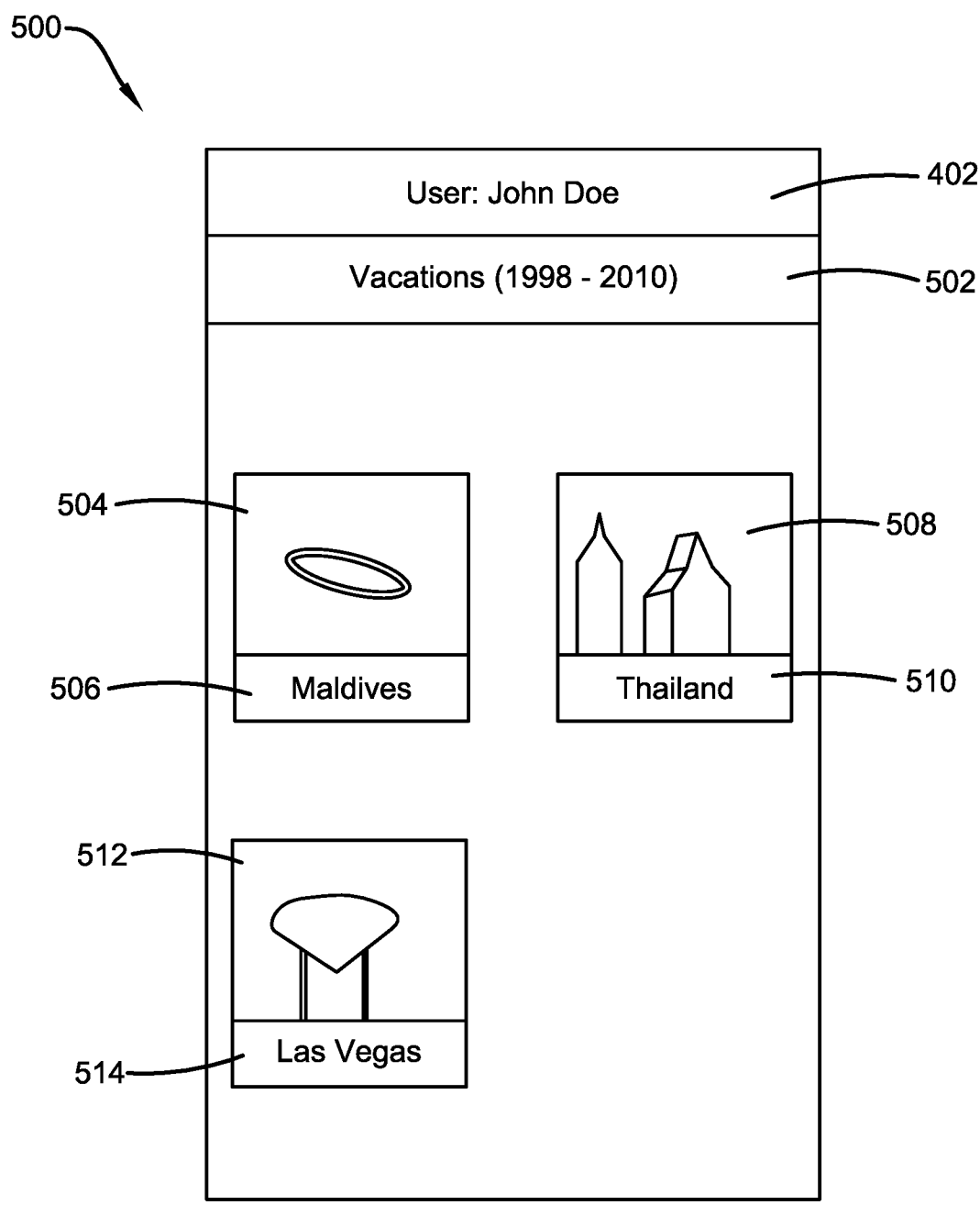
FIG. 5 illustrates an exemplary user interface displayed by the personal information storage application or website displaying media content or folders inside a respective category for a user to view in accordance with the disclosed architecture.

FIG. 5 illustrates an exemplary user interface 500 displayed by the personal information storage application 106 or website 108 displaying media content or folders inside a respective category for a user to view in accordance with the disclosed architecture. When a user selects one of the categories (categories shown in FIG. 4), the content stored in the category is illustrated to the user for viewing and to perform additional operations (as described in FIG. 7). As illustrated, when the vacations category is selected, the vacations category header 502 is displayed. Also, the sub-categories or sub-folders containing media are displayed in chronological order. For example, in the user interface 500, a thumbnail 504 associated with sub-category "Maldives" 506 is displayed. Similarly, thumbnail 508 and sub-category "Thailand" 510 is displayed and thumbnail 512 and sub-category "Las Vegas" 514 is displayed. The user can upload new media, documents, journals, videos and more in respective folders and also can create new sub-category as per their preferences.

Figure 6:
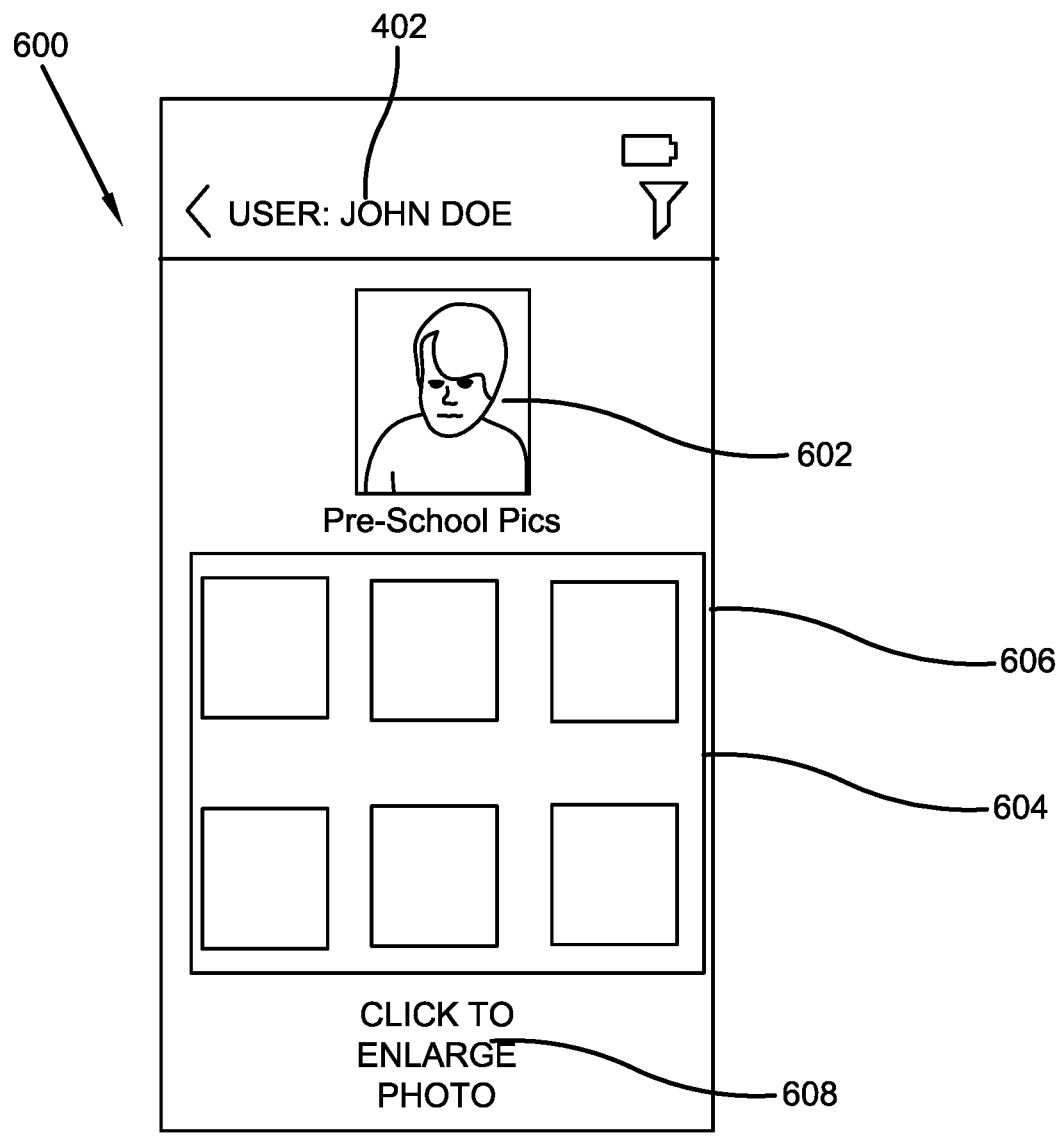
FIG. 6 illustrates yet another exemplary user interface displayed by the personal information storage application or website displaying media content when a category is selected by a user in accordance with the disclosed architecture.

FIG. 6 illustrates yet another exemplary user interface 600 displayed by the personal information storage application 106 or website 108 displaying media content when a category is selected by a user in accordance with the disclosed architecture. As illustrated, a category thumbnail and associated category "Pre-school pics" 602 is displayed on user interface 600. Further, exemplary or selected images 604, i.e., in a chronological arrangement, are displayed for a user to view instantly. The user interface 600 can be scrolled through by using the scroll bar 606 to view more images displayed on the user interface 600.

In the present embodiment, an option 608 to enlarge a selected image is provided, enabling the logged in user 402 to zoom in to the selected image/media as per their preferences.

Figure 7:
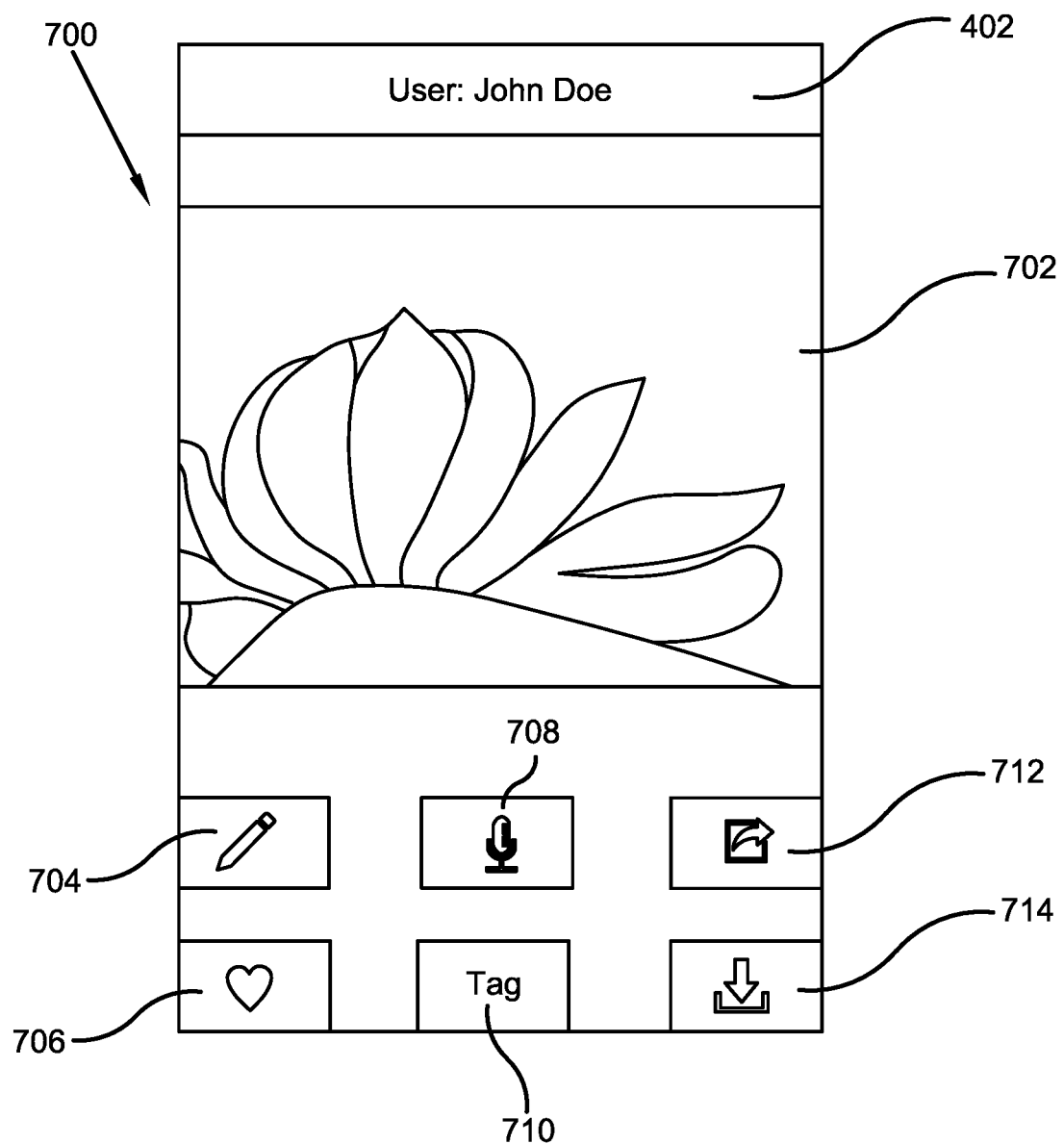
FIG. 7 illustrates yet another exemplary user interface displaying a single image by the personal information storage application or website for view by a user in accordance with the disclosed architecture.

FIG. 7 illustrates yet another exemplary user interface 700 displaying a single image by the personal information storage application 106 or website 108 for view by a user in accordance with the disclosed architecture. An advantage of the present invention is that a user can perform a set of operations on any media uploaded to the user account. As illustrated, when a media, such as image 702 is displayed, the application/website provides a set of tools for a user to use on the displayed media.

An edit option 704 is provided to edit the image/media 702. Based on the type of media, the edit options can be modified. As an example, for the image 702, edit options such as changing color, brightness, cropping the image and many more can be provided to the user. A heart shape option 706 enables a user to mark the media 702 as a favorite and when a media is assigned as Favorite, then, a copy of the image is added to a separate folder known as "Favorites".

For adding additional information, a voice note can be added or appended to the media 702 using the voice tag button 708. The application/website uses a microphone on the user's device for adding a voice note or tag. For adding hashtags to the media 702, a tag option 710 is provided to the user. The tag option 710 opens a text box (not shown), allowing the user to write a summary, a story, or any other tag associated with the media 702.

A share option 712 is provided by the user interface 700 that enables a user to share the displayed media to social network such as Facebook, Twitter, Instagram, and more. The share option 712 easily provides access to the third-party social media platforms for uploading the media. If the user wants to download the media, the download button 714 can be used by the user. While downloading, a specific resolution and format may also be selected by the user.

Figure 8:
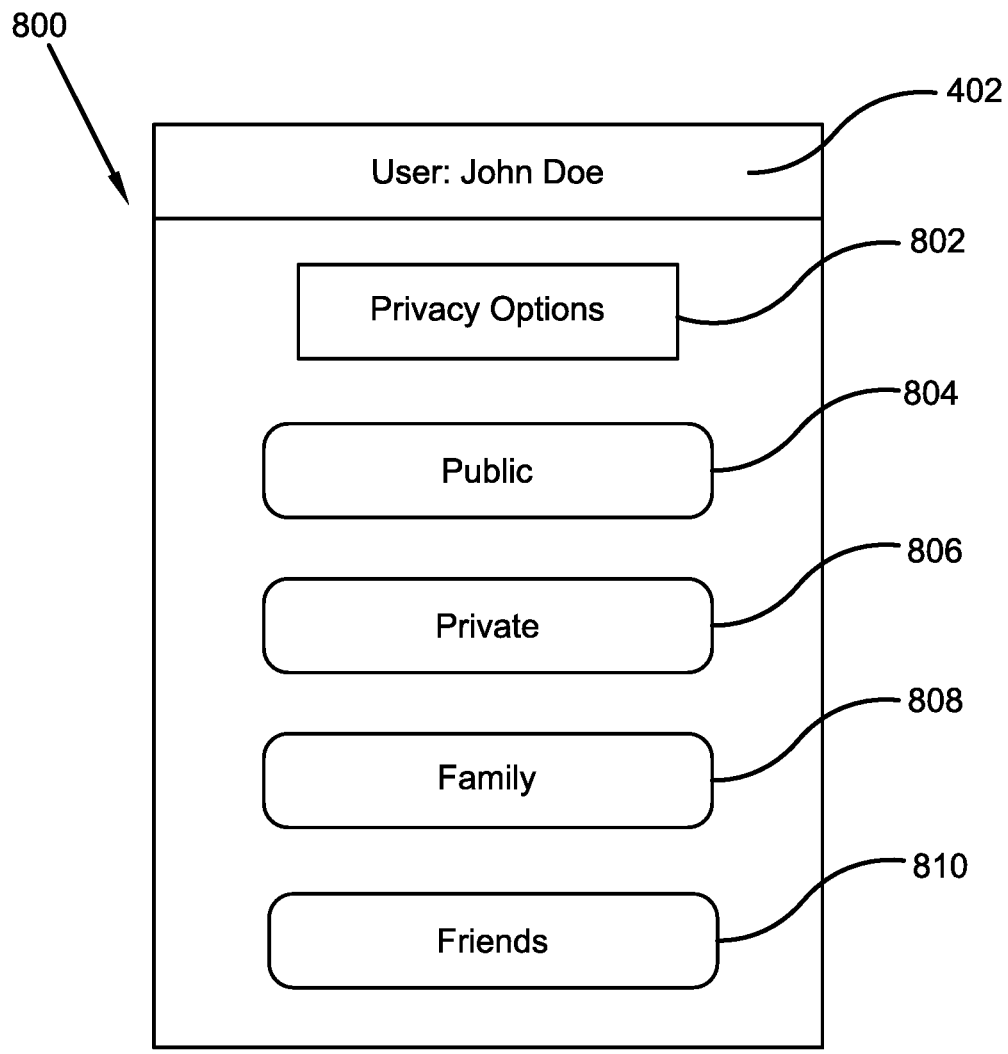
FIG. 8 illustrates yet still another exemplary user interface displaying security options for media stored in the user account in accordance with the disclosed architecture.

FIG. 8 illustrates yet another exemplary user interface 800 displaying security options for media stored in the user account in accordance with the disclosed architecture. The present invention enables users to upload photos, writings, and other information into their personal account for public or private display. Users are provided security options for the uploaded media that allow the media to be accessed publicly or not.

As illustrated, privacy options header 802 is displayed on top of the user interface 800 along with a list of options that can be selected by the user for the uploaded media. If a user selects public option 804, then the uploaded media can be accessed by other users from their respective accounts. Generally, any user can search for any other user's media through their account and in case the uploaded media of a user is public, then, they will be visible to other users.

If a user selects private option 806, then, the uploaded media of the user can be visible only from the logged in user account. Other options provided to a user are "Family" 808 and "Friends" 810 that allow access of the uploaded media to users tagged as family and friends respectively.

Figure 9:
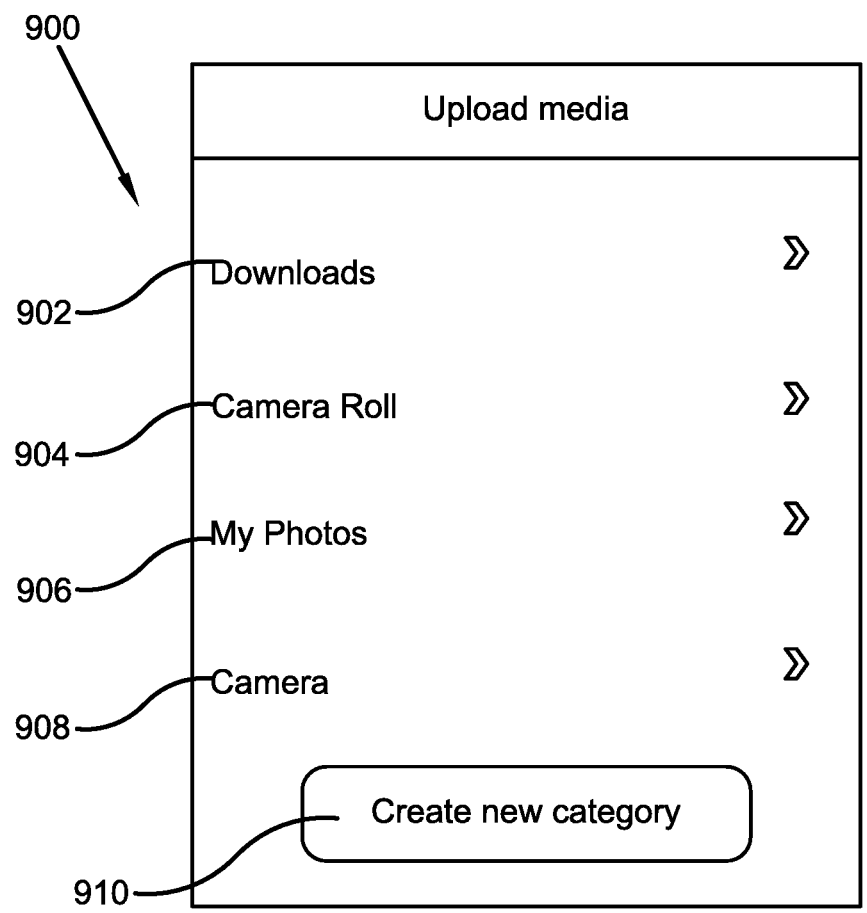
FIG. 9 illustrates yet further another exemplary user interface for uploading a media for storage in the system of the present invention in accordance with the disclosed architecture.

FIG. 9 illustrates yet another exemplary user interface 900 for uploading a media for storage in the system of the present invention in accordance with the disclosed architecture. As shown in the interface 900, a user is provided a plurality of options for uploading a media. It should be noted that the illustrated sources/options are exemplary and any number of options generally available to a user from the user device can be provided to the user.

A user can select "download options" 902 for uploading one or more media from download section of the user device from which the user is accessing the application or website. Similarly, the user can select one or more media for upload from the camera roll of the user device when the "camera roll" option 904 is selected. "my photos" option 906 enables the user to access media for uploading from any media repository in the user device or from a directory associated with the user device.

The camera option 908 enables the application/website to access the camera of the device and can be used for clicking a picture or recording a video for uploading to the account. A new category can be created by the user by clicking on "create new category" option 910 and a name can be provided to the created category for unique identification.

Figure 10:
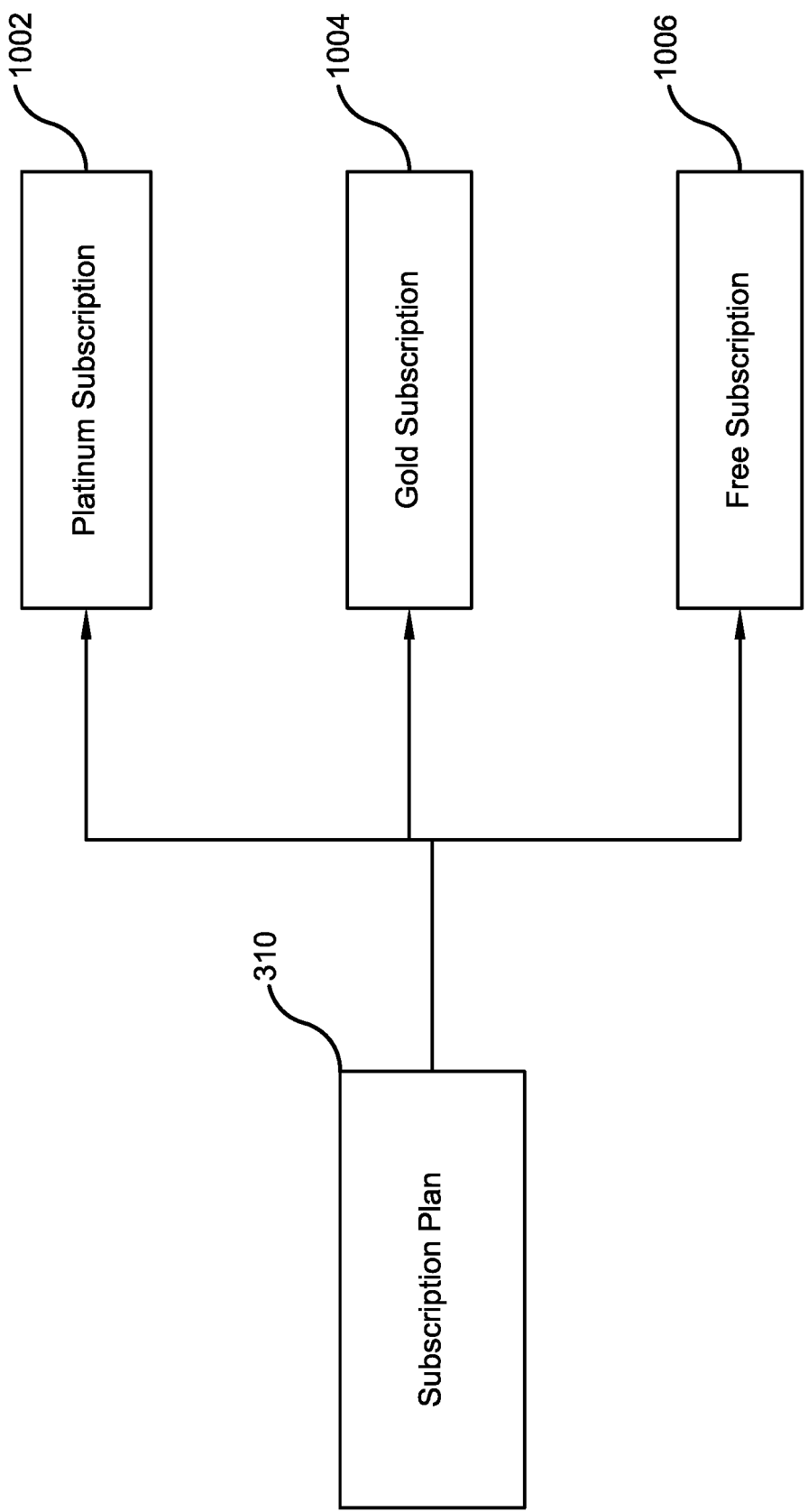
FIG. 10 illustrates a block diagram showing various membership/subscriptions offered in the system of the present invention in accordance with the disclosed architecture.

FIG. 10 illustrates a block diagram showing various membership/subscriptions offered in the system 100 of the present invention in accordance with the disclosed architecture. As shown in FIG. 10, subscription plan button 310 (as shown in FIG. 3), displays a plurality of subscriptions that a user can choose from. Users can also change their subscriptions as per their preferences. When the membership plan button 310 is pressed by the user, a next view displays the offered subscription/membership plans. A platinum subscription plan 1002 upgrades the profile to a platinum member that enables the user to use 100 GB of space for lifetime. Further, advanced editing features and security options are also provided to the user.

The gold subscription 1004 is an annual subscription that provides 100 GB storage space for a year, wherein the stored media is archived. The free subscription 1006 provides a limited space and editing capabilities to a user. Further, a user with free subscription 1006 cannot upload media from the application/website to third-party social media platforms.

Figure 11:
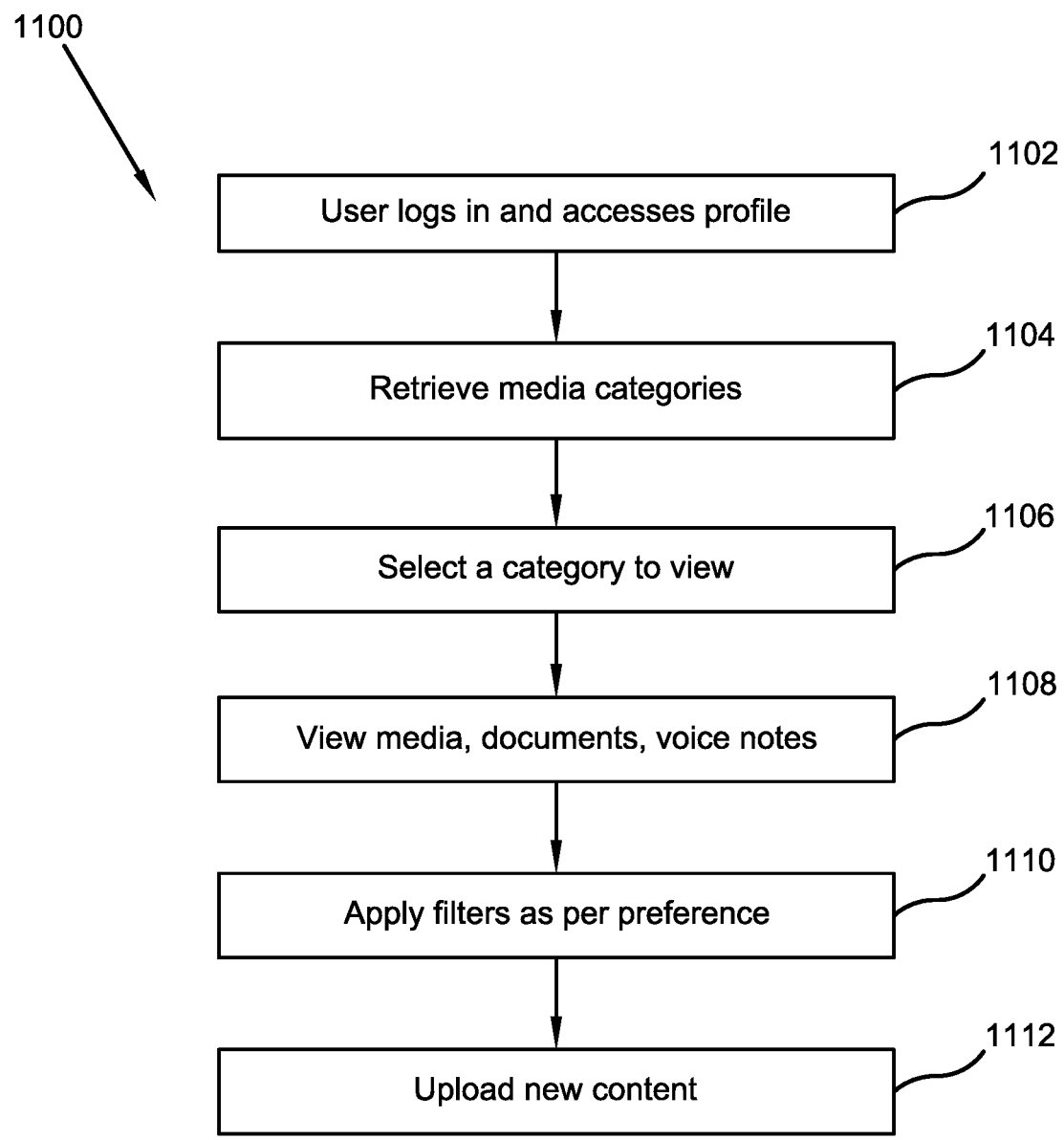
FIG. 11 represents an exemplary flow chart that illustrates steps of a method performed by a user of the software application and website of the present invention for viewing media in accordance with the disclosed architecture.

FIG. 11 represents an exemplary flow chart that illustrates steps of a method 1100 performed by a user of the software application 106 and website 108 of the present invention for viewing media in accordance with the disclosed architecture. Referring now to FIG. 11, the method 1100 generally starts at step 1102, where a user logs in and accesses his/her profile on the application 106 or website 108. Then, at step 1104, media categories in which media are uploaded by the user are displayed. Thereafter, at step 1106, as per the preference of the user, a category is selected by the user to view content stored in the category.

At step 1108, the stored media including photos, videos, documents and more in a chronological order can be selected and retrieved for display and optionally perform one or more functions as described in FIG. 7. For easy viewing, in step 1110, desired filters of date, location and more can be applied by the user. Finally, at step 1112, if a user wants to upload new content in the category, then, one or more new media can be uploaded as described in FIG. 9.

Figure 12:
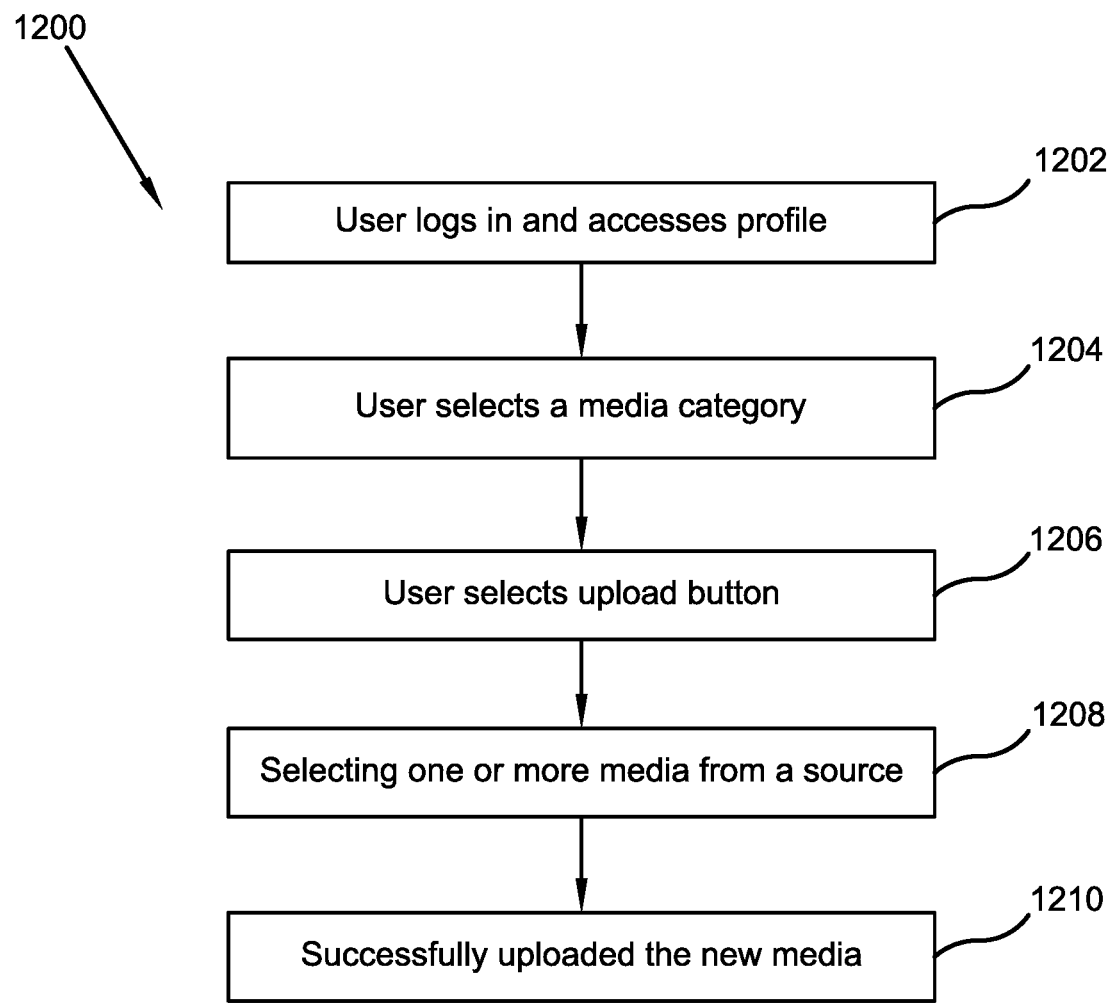
FIG. 12 represents an exemplary flow chart that illustrates steps of a method performed by a user of the software application and website of the present invention for uploading media in an existing category in accordance with the disclosed architecture.

FIG. 12 represents an exemplary flow chart that illustrates steps of a method 1200 performed by a user of the software application 106 and website 108 of the present invention for uploading media in an existing category in accordance with the disclosed architecture. The method 1200 generally starts at step 1202, where a user logs in and accesses his/her profile on the application 106 or website 108. Then, at step 1204, as per preference of the user, a category is selected by the user to upload content in the category. At step 1206, the upload button is selected by the user for selecting a source from which the media is to be uploaded. At step 1208, one or more medias are selected by the user from the selected source for adding to the selected category. Finally, at step 1210, uploaded media content is displayed on the category and can selected by user to view.

Figure 13:
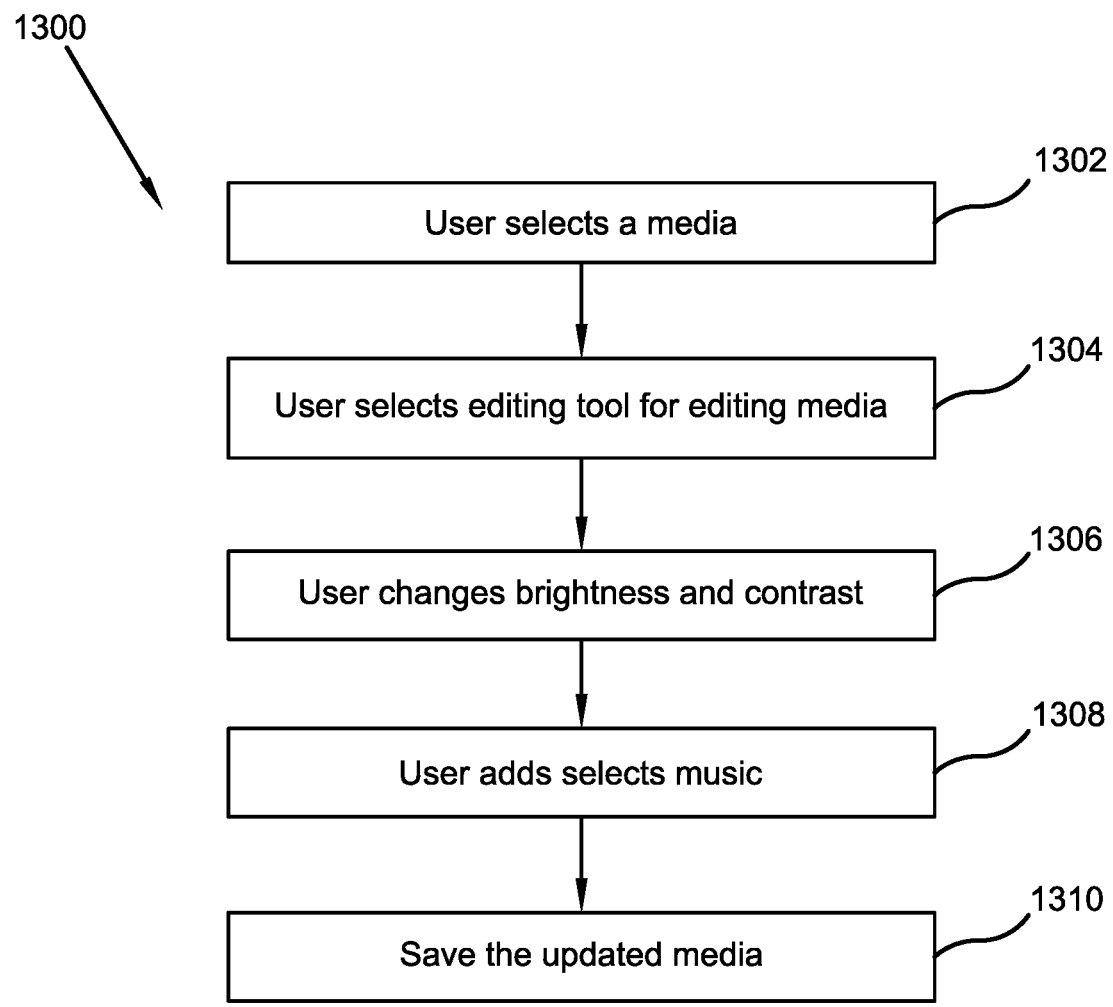
FIG. 13 represents an exemplary flow chart that illustrates steps of a method performed by a user of the software application and website of the present invention for editing an uploaded media in accordance with the disclosed architecture.

FIG. 13 represents an exemplary flow chart that illustrates steps of a method 1300 performed by a user of the software application 106 and website 108 of the present invention for editing uploaded media in accordance with the disclosed architecture. The method 1300 generally starts at step 1302, where a user selects a media from any category for editing. Then, at step 1304, as per preference of the user, the user selects one or more editing tools to change characteristics of the selected media. At step 1306, as an example, a user changes the brightness and contrast of the uploaded media.

At step 1308, one or more music or voice notes can be selected and added by the user for enhancing the media. Finally, at step 1310, the updated media content is saved by the user for future use.

Figure 14:
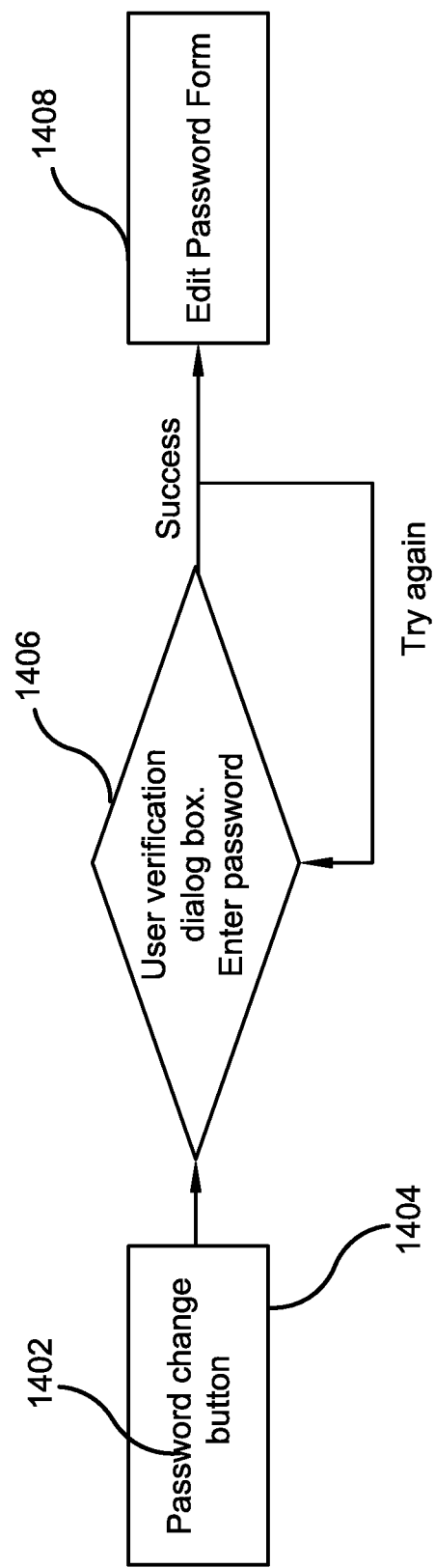
FIG. 14 illustrates a flow diagram showing an operation of changing a password in the software application and/or website of the present invention in accordance with the disclosed architecture.

FIG. 14 illustrates a flow diagram showing an operation of changing a password in the software application and/or website of the present invention in accordance with the disclosed architecture. The password change button 1402 is provided by the application/website and provides the user with an option to change the password and set a new password. When the user presses the change password button 1402 (Block 1404), the application/website provides a verification dialog box for the user to enter their current password for verification purposes (Block 1406). Once the password is successfully entered, then, the user is provided with an edit password form that enables the user to set the new password for their account (Block 1408). Further, in Block 1406, if the current password is not successfully entered, then, the user re-enters their current password for the verification purpose before resetting the password.

Figure 15:
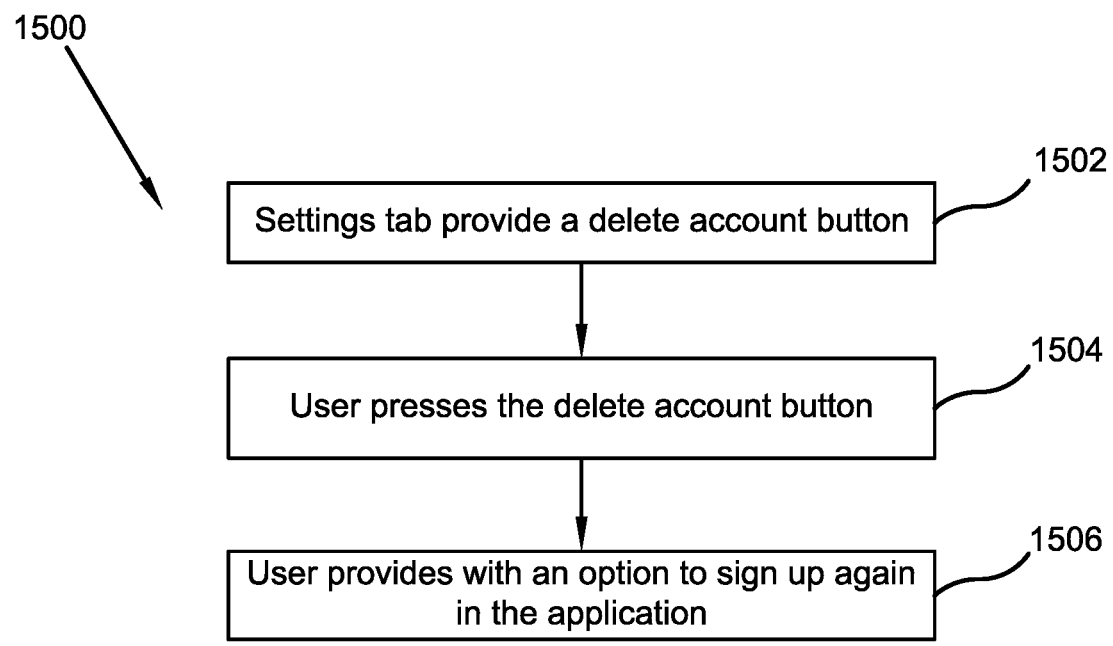
FIG. 15 illustrates a flow diagram of showing an operation of a user deleting their account of the system of the present invention in accordance with the disclosed architecture.

FIG. 15 illustrates a flow diagram of showing an operation of a user deleting their account of the system 100 of the present invention in accordance with the disclosed architecture. As shown in FIG. 15, the settings tab provides the user with a delete account option (Block 1502). When the user presses the delete account button for deleting the account (Block 1504), the account of the user and all the associated profile data and other personal information is deleted from server and database of the system. As the user deletes the account, the splash screen is displayed and the user is provided with an option to sign up again in the application (Block 1506).

Figure 16:
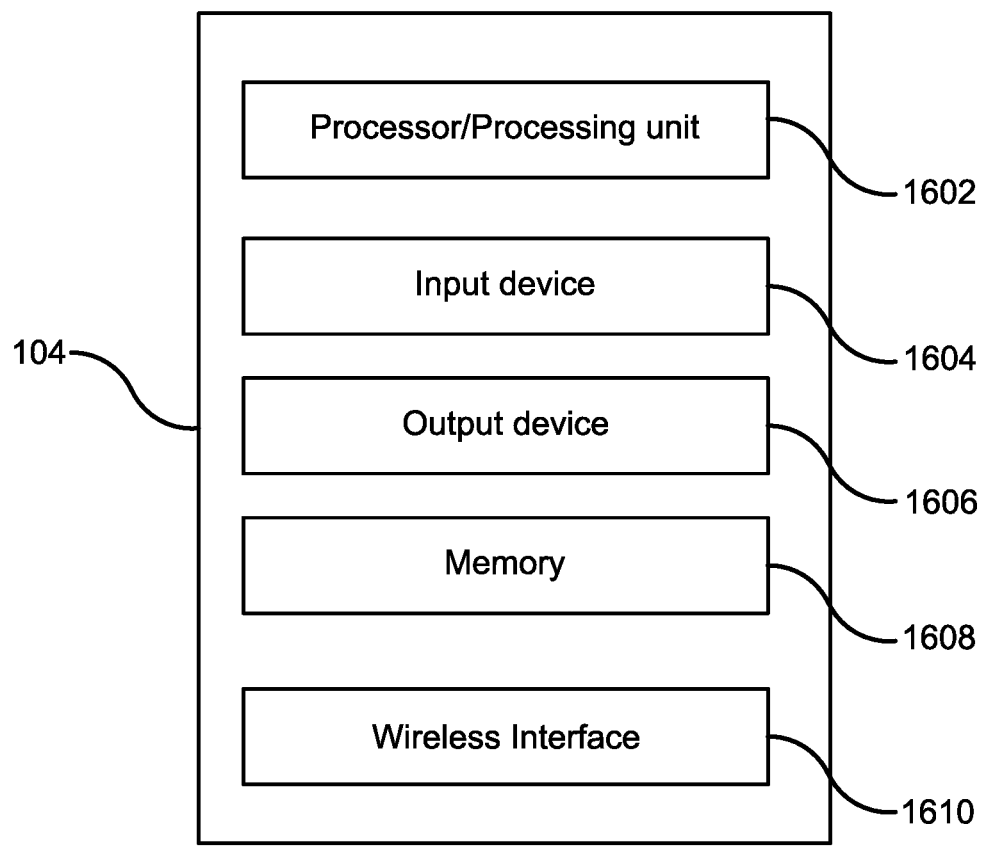
FIG. 16 illustrates an exemplary user device that is used for installing the software application of the present invention for communication with the server system in accordance with the disclosed architecture.

FIG. 16 illustrates an exemplary user device 104 that is used for installing the software application 106 of the present invention for communication with the server system in accordance with the disclosed architecture. The processing unit 1602 may include suitable logic, instructions, circuitry, interfaces, and/or codes for executing various operations, such as the operations associated with the user device 104, or the like. The processing unit 1602 may be configured to control one or more operations executed by the user device 104 in response to the input received at the user device 104 from the user. The processor 1602 executes the computer readable instructions stored in the application. Examples of the processing unit 1602 may include, but are not limited to, an application-specific integrated circuit (ASIC) processor, a reduced instruction set computing (RISC) processor, a complex instruction set computing (CISC) processor, a field-programmable gate array (FPGA), a programmable logic control unit (PLC), and the like. Embodiments of the present disclosure are intended to include or otherwise cover any type of the processing unit 1602, including known, related art, and/or later developed processing units. The user device 104 can further include one or more computer executable applications configured to be executed by the processing unit 1602. The one or more computer executable applications may include suitable logic, instructions, and/or codes for executing various operations. The one or more computer executable applications may be stored in the memory 1608. The one or more computer executable applications includes the application 106.

The user device 104 includes input device(s) 1604 such as a touch input device, voice input device, etc. for entering data and information. Preferably, the touch interface of the user device 104 is used as the input and various buttons/tabs shown on the application are pressed or clicked by the user. Other input devices such as camera and microphone are used during video chatting by the user. The display of the user device 104 also acts as the output device 1606 for displaying various content (e.g., text, images, videos, icons, and/or symbols, etc.) to the user. The display can include a touch screen, and may receive, for example, a touch, gesture, proximity, or hovering input using an electronic pen or a part of a user's body.

The electronic device 102 has memory 1608 used for storing programs (sequences of instructions) or data (e.g., program state information) on a temporary or permanent basis for use in the computer system. Memory 1608 can be configured for short-term storage of information as volatile memory and therefore not retain stored contents if powered off. Examples of volatile memory include random access memories (RAM), dynamic random-access memories (DRAM), static random-access memories (SRAM), and other forms of volatile memory known in the art. The processor 1602, in combination with one or more of memory 1608, input device(s) 1604 and output device(s) 1606, are utilized to provide users with the ability to execute instructions on the application 1000. The connection to a network is provided by wireless interface 1610.

The wireless interface 1610 enables the user's device 104 to communicate with the server 104 and other components of the system 100 over the communication network 106, according to embodiments of the present disclosure. Examples of the communication interface 1610 may include, but are not limited to, a modem, a network interface such as an ethernet card, a communication port, and/or a Personal Computer Memory Card International Association (PCMCIA) slot and card, an antenna, a radio frequency (RF) transceiver, one or more amplifiers, a tuner, one or more oscillators, a digital signal processor, a coder-decoder (CODEC) chipset, a subscriber identity module (SIM) card, and a local buffer circuit. It will be apparent to a person of ordinary skill in the art that the communication interface 1610 may include any device and/or apparatus capable of providing wireless or wired communications between the user device 104 and the server 102.

Embodiments of the present disclosure take the form of computer-executable instructions, including algorithms executed by a programmable computer. However, the disclosure can be practiced with other computer system configurations as well. Certain aspects of the disclosure can be embodied in a special-purpose computer or data processor that is specifically programmed, configured, or constructed to perform one or more of the computer-executable algorithms described below. Accordingly, the term "computer" as generally used herein refers to any data processor and includes internet appliances, hand-held devices (including tablets, computers, wearable computers, cellular or mobile phones, multi-processor systems, processor-based or programmable consumer electronics, network computers, minicomputers) and the like.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "system", "media storage and retrieval system", and "personal media storage system" are interchangeable and refer to the media storage and retrieval system 100 of the present invention. Similarly, as used herein "multifunctional software application", "software application", and "application" are interchangeable and refer to the multifunctional software application 106 of the present invention Notwithstanding the forgoing, the media storage and retrieval system 100 and the multifunctional software application 106 of the present invention can be of any suitable configuration as is known in the art without affecting the overall concept of the invention, provided that it accomplishes the above-stated objectives. One of ordinary skill in the art will appreciate that the configuration and specification of the components of the media storage and retrieval system 100 and the multifunctional software application 106 as shown in the FIGS. are for illustrative purposes only, and that many other configurations of the media storage and retrieval system 100 and the multifunctional software application 106 are well within the scope of the present disclosure.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A server system connected to a plurality of remote electronic devices for storing and sharing content, the server system comprising:
a plurality of electronic devices connected with an Internet communication network and an application installed in a user device;
wherein said application installed on said user device for displaying user interfaces allowing a user to access said server system;
wherein said user device enables a user to input data, receive data, and transmit data within said server system using said application;
wherein said server system includes a cloud storage for storing said content including media selected from a group consisting of a video, a picture, and a document;
wherein said user device is selected from a group consisting of a desktop computer, a notebook computer, a laptop computer, a handheld computer, a touch sensitive device, a computing device, a smart-phone, and a smart watch;
wherein said server system includes a network of computers selected from a group consisting of a personal computer, a laptop, a mini-computer, and a mainframe computer;
wherein said user device includes a non-transient and tangible machine for executing a machine-readable code to register a user, upload said media, and organize said media;
said register a user includes a privacy option to determine access to said media;
wherein organizing said media includes sorting said media into a plurality of categories and filtering said plurality of categories; and
further wherein said register a user includes a subscription plan.

2. The server system of claim 1, wherein said sorting includes chronological ordering of said media.

3. The server system of claim 1, wherein said register a user includes information selected from a group consisting of a user name, a password, an email, and a date of birth.

4. The server system of claim 1, wherein each said plurality of categories includes a thumbnail image.

5. The server system of claim 4, wherein said plurality of categories are selected from a group consisting of a school picture, a graduation, a vacation, a wedding, a sporting event, and a child.

6. The server system of claim 5, wherein said sorting includes chronological ordering of said media.

7. The server system of claim 1, wherein said privacy option includes public access.

8. The server system of claim 1, wherein said privacy option includes private access.

9. The server system of claim 1, wherein said privacy option includes selectable access by said user.

10. The server system of claim 1, wherein said subscription plan includes at least three levels of said access.

11. The server system of claim 10, wherein a first level of subscription includes a designated period of time of said access.

12. The server system of claim 11, wherein a second level of subscription includes an unlimited period of time of said access.

13. The server system of claim 11, wherein said designated period of time is displayed on said user device.

14. The server system of claim 6, wherein said user device includes a microphone for adding a voice message to said media.

15. A server system connected to a plurality of remote electronic devices for storing and sharing content, the server system comprising:
a plurality of electronic devices connected with an Internet communication network and an application installed in a user device;
wherein said application installed on said user device for displaying user interfaces allowing a user to access said server system;

wherein said user device enables a user to input data, receive data, and transmit data within said server system using said application;

wherein said server system includes a cloud storage for storing said content including media selected from a group consisting of a video, a picture, and a document;

wherein said user device is selected from a group consisting of a desktop computer, a notebook computer, a laptop computer, a handheld computer, a touch sensitive device, a computing device, a smart-phone, and a smart watch;

wherein said server system includes a network of computers selected from a group consisting of a personal computer, a laptop, a mini-computer, and a mainframe computer;

wherein said user device includes a non-transient and tangible machine for executing a machine-readable code to register a user, upload said media, and organize said media;

said register a user includes a privacy option to determine access to said media;

wherein organizing said media includes sorting said media into a plurality of categories and filtering said plurality of categories;

wherein said register a user includes a subscription plan;

wherein said sorting includes chronological ordering of said media;

wherein said register a user includes information selected from a group consisting of a user name, a password, an email, and a date of birth; and further wherein each said plurality of categories includes a thumbnail image.

16. The server system of claim 15, wherein said subscription plan includes at least three levels of said access, and further wherein a first level of subscription includes a designated period of time of said access, and a second level of subscription includes an unlimited period of time of said access.

17. A server system connected to a plurality of remote electronic devices for storing and sharing content, the server system comprising:

a plurality of electronic devices connected with an Internet communication network and an application installed in a user device;

wherein said application installed on said user device for displaying user interfaces allowing a user to access said server system;

wherein said user device enables a user to input data, receive data, and transmit data within said server system using said application;

wherein said server system includes a cloud storage for storing said content including media selected from a group consisting of a video, a picture, and a document;

wherein said user device is selected from a group consisting of a desktop computer, a notebook computer, a laptop computer, a handheld computer, a touch sensitive device, a computing device, a smart-phone, and a smart watch;

wherein said server system includes a network of computers selected from a group consisting of a personal computer, a laptop, a mini-computer, and a mainframe computer;

wherein said user device includes a non-transient and tangible machine for executing a machine-readable code to register a user, upload said media, and organize said media;

said register a user includes a privacy option to determine access to said media;

wherein organizing said media includes sorting said media into a plurality of categories and filtering said plurality of categories;

wherein said register a user includes a subscription plan;

wherein said sorting includes chronological ordering of said media;

wherein said register a user includes information selected from a group consisting of a user name, a password, an email, and a date of birth;

wherein each said plurality of categories includes a thumbnail image;

wherein said plurality of categories are selected from a group consisting of a school picture, a graduation, a vacation, a wedding, a sporting event, and a child;

wherein said privacy option includes selectable access by said user; and further wherein said subscription plan includes a level of said access selected from a group consisting of a designated period of time of said access and an unlimited period of time of said access.

18. The server system of claim 17, wherein said designated period of time is displayed on said user device.

19. The server system of claim 17, wherein said user device includes a microphone for adding a voice message to said media.

20. The server system of claim 17, wherein said user device includes a brightness and contrast control for editing said media.

* * * * *